United States Patent
Aoyama et al.

(10) Patent No.: US 7,790,783 B2
(45) Date of Patent: Sep. 7, 2010

(54) WATER-BASE INK COMPOSITION, INKJET RECORDING METHOD AND RECORDED MATTER

(75) Inventors: Tetsuya Aoyama, Shiojiri (JP); Daisuke Ishihara, Shiojiri (JP); Masahiro Yatake, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/588,861

(22) Filed: Oct. 27, 2006

(65) Prior Publication Data

US 2007/0117882 A1    May 24, 2007

(30) Foreign Application Priority Data

| Oct. 31, 2005 | (JP) | ............................. | 2005-316640 |
| Nov. 7, 2005 | (JP) | ............................. | 2005-322857 |
| Apr. 4, 2006 | (JP) | ............................. | 2006-103461 |
| Apr. 4, 2006 | (JP) | ............................. | 2006-103472 |

(51) Int. Cl.
  *C09D 11/00* (2006.01)
  *C08K 9/00* (2006.01)
  *B60C 1/00* (2006.01)
  *C08G 67/02* (2006.01)
  *C08L 31/00* (2006.01)

(52) U.S. Cl. .................. 523/160; 523/161; 523/200; 523/205; 106/31.3; 106/31.25; 106/31.6; 106/31.85; 106/31.9; 106/31.65; 524/492; 524/612; 524/556

(58) Field of Classification Search .................. 523/160, 523/161, 200, 205; 106/31.27, 31.6, 31.75, 106/31.9, 475, 31.3, 31.25, 31.85, 31.86, 106/31.65; 524/495, 492, 572, 612, 556
See application file for complete search history.

(56) References Cited

U.S. PATENT DOCUMENTS

| 5,356,464 A | * | 10/1994 | Hickman et al. | ......... 106/31.36 |
| 5,439,514 A | * | 8/1995 | Kashiwazaki et al. | .... 106/31.65 |
| 6,277,183 B1 | * | 8/2001 | Johnson et al. | .......... 106/31.27 |
| 2003/0144378 A1 | * | 7/2003 | Mizushima et al. | ......... 523/160 |

FOREIGN PATENT DOCUMENTS

| JP | 6-287492 | 10/1994 |
| JP | 8-319442 | 12/1996 |
| JP | 9-40895 | 2/1997 |
| JP | 2002-161225 | 6/2002 |
| JP | 2002-249685 | 9/2002 |
| JP | 2002-363470 | 12/2002 |
| JP | 2003-34770 | 2/2003 |
| JP | 2004-75988 | 3/2004 |
| JP | 2004-124081 | 4/2004 |
| JP | 2004-182889 | 7/2004 |
| JP | 2005-82607 | 3/2005 |
| JP | 2005-179482 | 7/2005 |
| JP | 2005-290044 | 10/2005 |

OTHER PUBLICATIONS

Patent Abstracts of Japan of 6-287492 dated Oct. 11, 1994.
Patent Abstracts of Japan of 8-319442 dated Dec. 3, 1996.
Patent Abstracts of Japan of 9-40895 dated Feb. 10, 1997.
Patent Abstracts of Japan of 2002-161225 dated Jun. 4, 2002.
Patent Abstracts of Japan of 2002-249685 dated Sep. 6, 2002.
Patent Abstracts of Japan of 2002-363470 dated Dec. 18, 2002.
Patent Abstracts of Japan of 2003-34770 dated Feb. 7, 2003.
Patent Abstracts of Japan of 2004-75988 dated Mar. 11, 2004.
Patent Abstracts of Japan of 2004-124081 dated Apr. 22, 2004.
Patent Abstracts of Japan of 2004-182889 dated Jul. 2, 2004.
Patent Abstracts of Japan of 2005-82607 dated Mar. 31, 2005.
Patent Abstracts of Japan of 2005-179482 dated Jul. 7, 2005.
Patent Abstracts of Japan of 2005-290044 dated Oct. 20, 2005.

* cited by examiner

*Primary Examiner*—Vasu Jagannathan
*Assistant Examiner*—Alexander C Kollias
(74) *Attorney, Agent, or Firm*—Ladas and Parry LLP

(57) ABSTRACT

A water-base ink composition comprising: a chromatic color pigment covered with a water-insoluble vinyl polymer; a titanium dioxide pigment; and water; and a water-base ink composition containing, in addition to a chromatic color pigment, dispersant and water, both a titanium dioxide pigment and silica pigment.

12 Claims, No Drawings

WATER-BASE INK COMPOSITION, INKJET RECORDING METHOD AND RECORDED MATTER

CROSS-REFERENCES TO RELATED APPLICATIONS

The entire disclosure of Japanese Patent Application No. 2005-322857, filed on Nov. 7, 2005, Japanese Patent Application No. 2005-316640, filed on Oct. 31, 2005, Japanese Patent Application No. 2006-103472, filed on Apr. 4, 2006 and Japanese Patent Application No. 2006-103461, filed on Apr. 4, 2006 are expressly incorporated herein by reference.

BACKGROUND

1. Technical Field

This invention relates to a water-base ink composition, recording method for performing printing using the water-base ink composition, and recorded matter printed by that recording method. In particular, this invention relates to a water-base ink composition with excellent coloring ability, and the ink composition being capable of preventing, without degrading the glossiness of printed matter, the phenomenon where the color of a light source reflected on a chromatic color ink is different from the color of the light source (bronzing); a recording method for performing printing using the water-base ink composition; and recorded matter printed using that recording method.

2. Related Art

Water-base inks where colorants composed of dyes and pigments are dispersed in water are in use as water-base ink compositions. In these water-base inks, colorants are dispersed in water-based dispersion media using dispersants such as surfactants and fine polymer dispersants, and many proposals have been made for such ink compositions.

It is conceivable to provide, as JP-A-2004-75988 proposes, a pigment ink with excellent coloring ability and glossiness by using an aqueous dispersant of water-insoluble vinyl polymer particles. It is also conceivable to provide, as JP-A-2004-124081 proposes, a pigment ink, as a colorant, capable of printing with high print density and having excellent color tone angle dependence, by using an aqueous dispersant of water-insoluble vinyl polymer particles containing C.I. pigment blue 15:4.

Also, as an example where a titanium dioxide pigment and a pigment serving as a colorant are used in a water-base ink composition, it is conceivable to use, as JP-A-1994-287492 proposes, an ink containing titanium dioxide and carbon black and having a hydrophilic-treated surface in an inkjet printer so that stable ejection can be realized and good print density can be achieved when printing is carried out onto plain paper.

Also, it is conceivable to provide, as JP-A-2002-249685 proposes, a static image display ink containing one of yellow, magenta, cyan and black pigments, and titanium oxide as inorganic oxide so that a fine image can be formed and easily erased on a static image display screen such as a white board.

It is also conceivable to provide, as JP-A-1996-319442 proposes, an inkjet water-base ink composition containing particles (titanium oxide, etc.) having no effect on a required recording color so that, when the ink is provided on a recording medium, or when fixation treatment is performed, or when cleaning treatment is performed, a clear image can be formed with only a small degree of smearing of the ink on the recording medium.

It is also conceivable to provide, as JP-A-2005-179482 proposes, a water-base ink composition prepared so that the weight ratio between titanium dioxide and a chromatic color pigment is 0.6 or greater to prevent bronzing and flip-flop.

In the meantime, conventional water-base ink compositions containing titanium dioxide pigments still have room for improvement regarding the prevention of bronzing. Bronzing notably occurs with cyan ink compositions in particular and there has been a desire for its prevention.

However, although the water-base ink compositions using aqueous dispersants described in the foregoing JP-A-2004-75988 and JP-A-2004-124081 have excellent coloring abilities, they cannot prevent bronzing sufficiently. Moreover, none of the foregoing JP-A-1994-287492, JP-A-2002-249685, or JP-A-1996-319442 discloses or mentions bronzing. Furthermore, although the water-base ink composition disclosed in JP-A-2005-179482 can prevent bronzing, there are cases where the glossiness of printed matter degrades as the concentration of titanium dioxide in the water-base ink composition increases. In other words, when the concentration of a chromatic color pigment increases, it becomes necessary to increase the concentration of titanium oxide in order to prevent bronzing, and, as a result, when the content of a chromatic color pigment exceeds 3 wt. %, the glossiness of printed matter degrades remarkably due to the increased titanium dioxide. Also, the increase in the concentration of titanium dioxide causes clogging of nozzles in inkjet printers and sometimes causes cohesion of dispersed resins, and so also degrades glossiness.

SUMMARY

The inventors have found that, by adding a combination of a chromatic color pigment covered with a water-insoluble vinyl polymer, and a titanium dioxide pigment to an ink, and also by adding the foregoing silica pigment thereto, excellent coloring ability can be obtained and bronzing can be prevented without degrading the glossiness of printed matter. This invention is based on these findings.

Accordingly, an advantage of some aspects of this invention is to provide a water-base ink composition having excellent coloring ability, the ink composition being capable of preventing bronzing without degrading the glossiness of printed matter; a recording method for performing printing using this water-base ink composition; and a recorded matter printed using that recording method.

Accordingly, this invention provides a water-base ink composition containing at least: a chromatic color pigment covered with a water-insoluble vinyl polymer; a titanium dioxide pigment; and water.

Preferable modes for this invention are as follows.

The water-insoluble vinyl polymer is preferably made by copolymerizing: (1) a macromer; (2) a polyoxyalkylene group-containing monomer; (3) a salt-forming group-containing monomer; and (4) a monomer that can be copolymerized with the macromer, a polyoxyalkylene group-containing monomer, and a salt-forming group-containing monomer, respectively.

The copolymerizable monomer is preferably one or more selected from the group consisting of a long-chain alkyl group-containing monomer, an aromatic ring-containing monomer, and a macromer.

It is desirable that the macromer be a styrene type macromer having a polymerizing functional group on one of its ends.

The long-chain alkyl group-containing monomer is preferably the one expressed by the following formula (I):

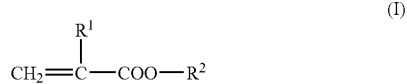

(where $R^1$ is a hydrogen atom or lower alkyl group and $R^2$ is a monovalent hydrocarbon having 16-30 carbons that may have a hetero atom).

It is also desirable that the weight ratio between the titanium dioxide pigment and the chromatic color pigment be 1:20 to 5:1.

It is also desirable that the initial particle diameter of the titanium dioxide pigment be no more than 1 μm.

It is also desirable that the water-base ink composition contain a silica pigment.

It is also desirable that the weight ratio between the total of the titanium dioxide pigment and silica pigment, and the chromatic color pigment be 1:20 to 5:1.

It is also desirable that the silica pigment be a colloidal silica.

It is also desirable that the water-base ink composition contain 2-methyl-2-propyl-1,3-propanediol or 2-butyl-2-ethyl-1,3-propanediol.

The chromatic color pigment is preferably a cyan pigment.

The cyan pigment is preferably one or more selected from the group consisting of C.I. pigment blue 15, 15:1, 15:2, 15:3, 15:4, and 16.

This invention also provides an ink composition containing at least: a chromatic color pigment; a dispersant; and water, wherein a titanium dioxide pigment and a silica pigment are also contained simultaneously.

It is desirable that the water-base ink composition further contain a penetration solvent and/or a wetting agent.

It is desirable that the penetration solvent is a penetrating organic solvent selected from the group consisting of monovalent alcohols, glycol ethers, and 1,2-alkanediols.

This invention also provides an inkjet recording method for performing printing by ejecting a droplet of a water-base ink composition and depositing it on a recording medium, wherein the aforementioned water-base ink composition is used.

This invention further provides recorded matter recorded by the foregoing inkjet recording method.

DESCRIPTION OF EXEMPLARY EMBODIMENTS

Embodiment

Water-Base Ink Composition

A water-base ink composition according to this Embodiment is explained in detail. This water-base ink composition contains at least a chromatic color pigment covered with a water-insoluble vinyl polymer; titanium dioxide pigment; and water.

The water-base ink composition according to this embodiment also contains a silica pigment. Because this water-base ink composition contains both the titanium dioxide pigment and silica pigment, its bronzing-prevention properties can be improved more than would be the case in a water-base ink composition containing only one of them, not to mention a water-base ink composition containing none of them, without having to degrade the glossiness of printed matter. The chromatic color pigment, titanium dioxide pigment and silica pigment may be dispersed together but the same effects can also be obtained when mixing the respective solutions where these pigments have already been dispersed separately.

Water-Insoluble Polymer

The water-insoluble vinyl polymer is explained below. It is preferable to use as the water-insoluble vinyl polymer—a constituent element of the water-base ink composition according to this Embodiment—a polymer obtained by polymerizing (1) 0.1-40 wt. % macromer; (2) 5-50 wt. % polyoxyalkylene group-containing monomer; (3) 3-40 wt. % salt-forming group-containing monomer; and (4) a monomer composition containing 15-90 wt. % monomer (simply called "copolymerizable monomer"), which can be copolymerized with the above macromer, a polyoxyalkylene group-containing monomer and a salt-forming group-containing monomer.

A representative example of the macromer—one of the materials composing the water-insoluble vinyl polymer—is a macromer having a polymerizing functional group on one of its ends ("one end") and its number-average molecular weight at preferably 500-500000, or more preferably, 1000-10000.

Examples of the macromer include: a styrene type macromer having a polymerizing functional group on one end; a silicone type macromer having a polymerizing functional group on one end; a methyl methacrylate type macromer having a polymerizing functional group on one end; a styrene-acrylonitrile type macromer having a polymerizing functional group on one end; a butylacrylate type macromer having a polymerizing functional group on one end; and an isobutylmethacrylate type macromer having a polymerizing functional group on one end. Of these macromers, the styrene type macromer having a polymerizing functional group on one end is preferable from the viewpoint of having a vinyl polymer contain a colorant sufficiently.

Examples of the styrene type macromer having a polymerizing functional group on one end include a styrene homopolymer having a polymerizing functional group on one end, and a copolymer composed of styrene and another monomer and having a polymerizing functional group on one end.

Regarding the styrene/other monomer-composed copolymer having a polymerizing functional group on one end, the other monomer is, for example, acrylonitrile. The content of styrene is preferably no less than 60 wt. %, or more preferably, no less than 70 wt. % from the viewpoint of having a pigment be sufficiently contained in the vinyl polymer.

Of styrene type macromers each having a polymerizing functional group on one end, a styrene type macromer having, as a polymerizing functional group, an acryloyl group or methacryloyl group on one end is preferable.

Examples of commercially available styrene type macromers include AS-6, AS-6S, AN-6, AN-6S, HS-6S, HS-6 manufactured by TOAGOSEI Co., LTd.

Incidentally, the number-average molecular weight of the macromer is measured by gel chromatography, with chloroform containing 1 mmol/L dodecyl-dimethylamine used as a solvent and polystyrene used as a reference material.

The content of the macromer in the water-insoluble vinyl polymer is preferably 0.1-40 wt. %, or more preferably, 1-30 wt. % in light of waterfastness and rubbing resistance.

The polyoxyalkylene group-containing monomer used as one of the materials composing the water-insoluble vinyl polymer is preferably, a monomer ("monomer A") expressed by the following chemical formula (II):

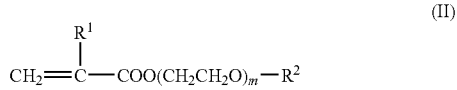

(II)

(where $R^1$ is a hydrogen atom or methyl group, $R^2$ is a hydrogen atom, alkyl group having 1-20 carbons or alkylphenyl group having 1-9 carbons, and m is a numeral 1-30); or one or more monomers ("monomer(s) B") selected from the group consisting of: a monomer ("monomer B1") expressed by the following chemical formula (III):

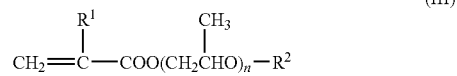

(III)

(where $R^1$ and $R^2$ are the same as above and n is a numeral 1-30); a monomer ("monomer B2") expressed by the following chemical formula (IV):

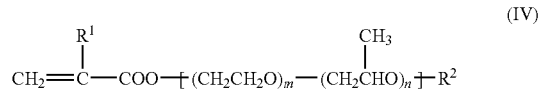

(IV)

(where $R^1$, $R^2$, m and n are the same as above and the order of the oxyethylene group and oxypropylene group in the brackets [ ] is not limited to a certain order and may be random or block); and a monomer ("monomer B3") expressed by the following formula (V):

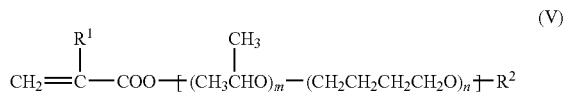

(V)

(where $R^1$, $R^2$, m and n are the same as above and the order of the oxyethylene group and oxytetramethylene group in the brackets [ ] is not limited to a certain order and may be random or block).

Because monomer A is used in the water-insoluble vinyl polymer, a water-base ink composition having excellent printed image glossiness, ink storage stability, and recovery from clogging can be obtained. This is because the hydrophilic hydration layer of the highly-hydrophilic oxyethylene group in monomer A expands in the water-base ink composition.

When monomer B1 is used in the water-insoluble vinyl polymer, an ink composition having excellent ejection stability can be obtained. This is because strong hydrophobic interaction occurs between the highly hydrophobic oxypropylene group in monomer B1 and the chromatic color pigment, the water-insoluble vinyl polymer expresses strong adsorption for the chromatic color pigment, and so the polymer particles containing the chromatic color pigment express strong hydrophobicity, and consequently, the viscosity of the water-base ink composition is reduced.

When monomer B2 or B3 is used in the water-insoluble vinyl polymer, the chromatic color pigment has excellent dispersion stability. This is because the hydrophilic hydration layer of highly-hydrophilic oxyethylene group or oxytetramethylene group expands in the water-base ink composition.

When monomer A—polyoxyalkylene group-containing monomer—is used in the water-insoluble vinyl polymer in combination with the foregoing macromer, salt-forming group-containing monomer, and copolymerizable monomer, the resulting water-base ink composition has a tendency to penetrate into plain paper (copy paper) excessively.

Accordingly, from the viewpoint of adjusting penetration into plain paper and enhancing print density, it is desirable that both monomer A and monomer B be used in the water-insoluble vinyl polymer. In this case, the weight ratio of monomer A to monomer B (monomer A/monomer B) is preferably 1/5-5/1, or more preferably, 1/3-3/1, from the viewpoint of realizing excellent glossiness and high print density.

Incidentally, with a vinyl polymer where a (metha) acrylic acid ester monomer containing only an oxypropylene group is copolymerized with a (metha) acrylic acid ester monomer containing only an oxyethylene group, or with a vinyl polymer where a (metha) acrylic acid ester monomer containing only an oxypropylene group is copolymerized with a (metha) acrylic acid ester monomer containing only an oxytetramethylene group, the dispersion stability of a water-insoluble polymer containing a chromatic color pigment cannot be enhanced. This is because the hydrophilic hydration layer does not expand sufficiently in the water-base ink composition.

As mentioned above, in the foregoing formulas (II)-(V), $R^1$ is a hydrogen atom or methyl group. $R^2$ is a hydrogen atom, alkyl group having 1-20 carbons or alkylphenyl group having 1-9 carbons. Among these, an octyl group or nonylphenyl group is preferable from the viewpoint of waterfastness and rubbing resistance.

'm' is a numeral 1-30. From the viewpoint of ejection stability and print density, m is preferably a numeral between 2 to 25. 'n' is also a numeral 1-30. In light of ejection stability and print density, n is preferably a numeral between 2 to 25.

In monomer B2, the oxyethylene group and oxypropylene group are added by block addition or random addition.

In monomer B3, the oxypropylene group and oxytetramethylene group are added by block addition or random addition.

An representative example of monomer A is polyethylene glycol mono(metha)acrylate. Examples of commercially available monomer A include NK esters M-20G, 40G, 90G and 230G manufactured by SHIN-NAKAMURA CHEMICAL CO., LTD and BLEMMER PE series PME-100, 200, 400, and 1000 manufactured by NOF CORPORATION.

The content of monomer A in the vinyl polymer is preferably 2-45 wt. %, or more preferably 2-30 wt. %, from the viewpoint of print density and ink viscosity.

Examples of monomer B1 include polypropylene glycol mono(metha)acrylate.

Examples of monomer B2 include ethylene glycol/propylene glycol(metha)acrylate, poly(ethylene glycol/propylene glycol)mono (metha)acrylate, octoxypolyethylene glycol/polypropylene glycol mono metha)acrylate, octoxypoly(ethylene glycol/propylene glycol)mono(metha)acrylate, stearoxypolyethylene glycol/polypropylene glycol mono(metha) acrylate, stearoxypoly(ethylene glycol/propylene glycol) mono(metha)acrylate, nonylphenoxypolyethylene glycol/polypropylene glycol mono(metha)acrylate, nonylphenoxypoly(ethylene glycol/propylene glycol)mono (metha)acrylate. Each of these elements may be used alone, or in a combination of two or more.

Examples of monomer B3 include propylene glycol/tetramethylene glycol mono(metha)acrylate, poly(propylene glycol/tetramethylene glycol)mono (metha)acrylate, propylene glycol/polybutylene glycol mono(metha)acrylate, and poly(propylene glycol/butylene glycol)mono(metha)acrylate. Each of these elements may be used alone, or in a combination of two or more.

Of monomers B1-B3, polypropylene glycol mono(metha)acrylate, ethylene glycol/propylene glycol(metha)acrylate and poly(ethylene glycol/propylene glycol)mono(metha) acrylate are preferable in light of ink viscosity and ejection stability.

Examples of commercially available monomers B1-B3 include BLEMMER PP-1000, PP-500, PP-800, AP-150, AP-400, AP-550, AP-800, 50PEP-300, 70PEP-350B, AEP series, 30PPT-800, 50PPT-800, 70PPT-800, APT series, 10PPB-500B, 10APB-500B, 50POEP-800B, 50AOEP-800B, ASEP series, PNEP series, PNPE series, 43 ANEP-500, 70 ANEP-550 manufactured by NOF CORPORATION.

The content of monomer B in the water-insoluble vinyl polymer is preferably 5-45 wt. %, or more preferably 5-40 wt. % in light of the glossiness of printed matter and high print density.

The content of polyoxyalkylene group-containing monomer in the water-insoluble vinyl polymer is preferably 5-50 wt. %, or more preferably, 10-40 wt. % from the viewpoint of improving the ejection stability of the water-base ink composition and the printed image glossiness and preventing degradation of coloring ability on plain paper.

An anionic monomer or cationic monomer is desirable as the salt-forming group-containing monomer. The anionic monomer and cationic monomer may be used separately or together.

For the anionic monomer, one or more selected from the group consisting of unsaturated carboxylic acid monomer, unsaturated sulfonic acid monomer, and unsaturated phosphoric acid monomer can be used.

Examples of the unsaturated carboxylic acid monomers include acrylic acid, methacrylic acid, crotonic acid, itaconic acid, maleic acid, fumaric acid, citraconic acid, and 2-methacryloyl oxymethyl succinic acid. Each of these monomers may be used alone, or in a combination of two or more.

Examples of the unsaturated sulfonic acid monomers include styrenesulfonic acid, 2-acrylamide-2-methylpropanesulfonic acid, 3-sulfopropyl(metha)acrylic acid ester, and bis-(3-sulfopropyl)-itaconic acid ester. Each of these monomers may be used alone, or in a combination of two or more.

Examples of the unsaturated phosphoric acid monomers include vinyl phosphonic acid, vinyl phosphate, bis(methacryloxyethyl)phosphate, diphenyl 2-acryloyloxyethyl phosphate, diphenyl-2-methacryloyloxyethyl phosphate, and dibutyl-2-acryloyloxyethyl phosphate. Each of these elements used solely or two or more of these monomers may be used together.

Of these anionic monomers, it is desirable to use unsaturated carboxylic acid, and it is more desirable to use acrylic acid and methacrylic acid, in light of ink viscosity and ejection stability.

Examples of the cationic monomer include one or more selected from the group consisting of an unsaturated tertiary amine-containing vinyl monomer and unsaturated ammonium salt-containing vinyl monomer.

Examples of the unsaturated tertiary amine-containing monomer include N,N-dimethylaminoethyl(metha)acrylate, N,N-dimethylaminopropyl(metha)acrylate, N,N-diethylaminoethyl(metha)acrylate, N,N-dimethylaminopropyl(metha) acrylamide, N,N-dimethylarylamine, vinyl pyrrolidone, 2-vinylpyridine, 4-vinylpyridine, 2-methyl-6-vinylpyridine, and 5-ethyl-2-vinylpyridine. Each of these monomers may be used alone, or in a combination of two or more.

Examples of the unsaturated ammonium salt-containing monomer include a quaternized N,N-dimethylaminoethyl (metha)acrylate, quaternized N,N-diethylaminoethyl(metha) acrylate, and quaternized N,N-dimethylaminopropyl(metha) acrylate. Each of these monomers may be used alone, or in a combination of two or more.

Of these cationic monomers, N,N-dimethylaminoethyl (metha)acrylate, N,N-dimethylaminopropyl(metha)acrylamide, and vinyl pyrrolidone are desirable.

The content of salt-forming group-containing monomer in the water-insoluble vinyl polymer is preferably 3-40 wt. %, or more preferably, 5-30 wt. % in light of dispersion stability and ejection stability.

Examples of a copolymerizable monomer (a monomer that can be copolymerized with the aforementioned macromer, polyoxyalkylene group-containing monomer, and salt-forming group-containing monomer) include a long-chain alkyl group-containing monomer, aromatic ring-containing monomer, and (metha)acrylic acid ester. From among these, it is desirable to use one or more types selected from the groups consisting of long-chain alkyl group-containing monomers and aromatic ring-containing monomers from the viewpoint of preventing changes in the viscosity of the water-base ink composition caused by a wetting agent and dispersant added when preparing the water-base ink composition, as well as the viewpoint of improving the storage stability of the water-base ink composition. Each of these monomers may be used alone, or in a combination of two or more. The copolymerizable monomer preferably contains one or more types selected from the group consisting of long-chain alkyl group-containing monomers and aromatic ring-containing monomers.

In the long-chain alkyl group-containing monomer ("long-chain alkyl group-containing monomer"), the number of carbons in the long-chain alkyl group is preferably 16-30, or more preferably, 18-22 in light of easy acquisition of the monomer. A representative example of the long-chain alkyl group-containing monomer is a monomer expressed by the following chemical formula (I):

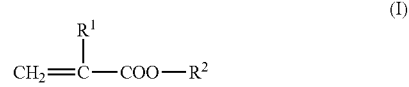

(I)

(where $R^1$ is a hydrogen atom or lower alkyl group having 1-4 carbons and $R^2$ is a monovalent hydrocarbon radical having 16-30 carbons that may have a hetero atom, or preferably, 18-30 carbons, or more preferably, 18-22 carbons.

Examples of the long-chain alkyl group-containing monomer include (metha)acrylic acid esters such as (iso)cetyl (metha)acrylate, (iso)stearyl(metha)acrylate, and (iso)behenyl(metha)acrylate. Each of these monomers may be used alone, or in a combination of two or more. Of these, (iso) stearyl(metha)acrylate and/or (iso)behenyl(metha)acrylate are desirable. The long-chain alkyl group-containing monomers are preferable from the viewpoint of preventing changes in the viscosity of the water-base ink composition caused by the wetting agent and dispersant added when preparing the water-base ink composition, as well as from the viewpoint of sufficiently improving the storage stability. The total content of stearyl(metha)acrylate and behenyl(metha)acrylate in the monomer mixture is preferably 5-50 wt. %, or more preferably, 10-30 wt. % from the viewpoint of preventing changes in the viscosity of the water-base ink composition and sufficiently improving the storage stability.

In light of waterfastness, the aromatic ring-containing monomer is preferably one or more selected from the group consisting of styrene, vinylnaphthalene, α-methylstyrene, vinyl toluene, ethylvinylbenzene, 4-vinylbiphenyl, 1,1-diphenylethylene, benzyl(metha)acrylate, phenoxyethyl (metha)acrylate, 2-hydroxy-3-phenoxypropyl acrylate, 2-methacryloyloxyethyl-2-hydroxypropylphthalate, 2-acryloyloxyethyl phthalate, and neopentyl glycol acrylate benzoic acid ester. Of these, one or more selected from the group consisting of styrene, α-methylstyrene, vinyl toluene, and vinylnaphthalene is desirable in light of waterfastness and rubbing resistance.

Examples of the (metha)acrylic acid ester include (metha) acrylic acid esters where ester portions are alkyl groups having 1-18 carbons, such as methyl(metha)acrylate, ethyl (metha)acrylate, (iso)propyl(metha)acrylate, (iso or tertiary) butyl(metha)acrylate, (iso)amyl(metha)acrylate, cyclohexyl (metha)acrylate, benzyl(metha)acrylate, 2-ethylhexyl (metha)acrylate, (iso)octyl(metha)acrylate, (iso)decyl (metha)acrylate, (iso)dodecyl(metha)acrylate, and (iso)stearyl(metha)acrylate. Each of these monomers may be used alone, or in a combination of two or more.

Incidentally, (iso or tertiary) and (iso) indicate both the case where those groups exist and the case where they do not, and, in the latter case, they mean normal.

The content of copolymerizable monomer in the water-insoluble vinyl polymer is preferably 15-90 wt. %, or more preferably 35-80 wt. % in light of print density and waterfastness.

If an aromatic ring-containing monomer is to be contained in the water-insoluble vinyl polymer, the content is preferably 0.1-70 wt. %, or more preferably, 1-50 wt. % in light of waterfastness, rubbing resistance, ink viscosity and ejection stability.

The weight-average molecular weight of the water-insoluble vinyl polymer is normally 3,000-300,000 in light of print density and ejection stability. Incidentally, this weight-average molecular weight of the water-insoluble vinyl polymer can be controlled by a common technique of adding a chain transfer agent such as mercaptan.

The weight-average molecular weight of the water-insoluble vinyl polymer is obtained by drying a portion of the obtained water-insoluble vinyl polymer solution under reduced pressure at 105° C. for two hours, isolating it by eliminating a solvent, and performing gel permeation chromatography using polystyrene as a reference material and using 60 mmol/L phosphoric acid and 50 mmol/L lithium bromide-containing dimethylformamide as a solvent.

The water-insoluble vinyl polymer is obtained by mixing and polymerizing predetermined amounts of (1) the foregoing macromer, (2) polyoxyalkylene group-containing monomer, (3) salt-forming group-containing monomer and (4) copolymerizable monomer. More precisely, it is manufactured by polymerizing the respective monomer compositions by a well-known polymerization method such as bulk polymerization, solution polymerization, suspension polymerization, and emulsion polymerization. Of these methods, solution polymerization is preferred.

The solvent used in the solution polymerization is preferably a polar organic solvent. If the polar organic solvent is a water miscible solvent, it may be used with water.

Examples of the polar organic solvent include: aliphatic alcohols having 1-3 carbons such as methanol, ethanol, propanol, and isopropyl alcohol; and ketones such as acetone and methylethylketone; and esters such as ethyl acetate. Of these, methanol, ethanol, isopropyl alcohol, acetone, or methylethylketone, or a mixture of the element(s) and water is preferred.

Incidentally, during polymerization, a radical polymerization initiator may be used. An azo compound such as 2,2'-azobisisobutylnitrile, 2,2'-azobis (2,4-dimethylvaleronitrile), dimethyl-2,2'-azobisbutylate, 2,2'-azobis (2-methylbutylonitril), or 1,1'-azobis(1-cyclohexanecarbonitril) is preferable as the radical polymerization initiator. Organic peroxides such as t-butylperoxy octoate, di-t-butylperoxide, and dibenzoyl oxide may also be used.

The amount of the polymerization initiator is preferably 0.001-5 mol, or more preferably, 0.01-2 mol per 1 mol monomer composition.

During the polymerization, a polymerization chain transfer agent may also be added. Examples of the polymerization chain transfer agent include mercaptans such as octyl mercaptan, n-dodecyl mercaptan, t-dodecyl mercaptan, n-tetradecyl mercaptan, and 2-mercaptoethanol; xanthogen disulfides such as dimethyl xanthogen disulfide and diisopropyl xanthogen disulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, dipentene, α-methylstyrene dimer, 9,10-dihydroanthracene, 1,4-dihydronaphthalene, indene, and 1,4-cyclohexadiene; and unsaturated heterocylic compounds such as 2,5-dihydrofurane. Each of these copolymerization chain transfer agents may be used alone, or in a combination of two or more.

The conditions for polymerization of the monomer composition cannot be determined simply because they vary depending on the types of radical polymerization initiators, monomers and solvents used. Normally, the polymerization temperature is preferably 30-100° C., or more preferably, 50-80° C. and the polymerization time is 1-20 hours. The polymerization atmosphere is preferably an inert gas atmosphere such as a nitrogen gas atmosphere.

After the polymerization reaction is over, the generated water-insoluble vinyl polymer is isolated from the reaction solution by a well-known method such as reprecipitation or solvent distillation. The obtained water-insoluble vinyl polymer may also be purified by repeating reprecipitation or eliminating unreacted monomers by membrane separation, chromatography, or extraction.

Chromatic Color Pigment

Examples of a chromatic color pigment to be covered with the water-insoluble vinyl polymer include a cyan pigment, yellow pigment, magenta pigment, etc. The "chromatic color" refers to all the colors except for a series of colors ranging from white through grey to black (achromatic colors).

Examples of the cyan pigment include C.I. pigment blue 1, 2, 15, 15:1, 15:2, 15:3, 15:4, 16, and C.I. vat blue 4 and 60 etc. Each of these cyan pigments may be used alone, or in a combination of two or more Examples of the yellow pigment include C.I. pigment yellow 1, 3, 12, 13, 14, 17, 24, 35, 37, 42, 53, 55, 74, 81, 83, 95, 97, 98, 100, 101, 104, 108, 109, 110, 117, 120, 128, 138, 147, 150, 153, 155, 174, 180, 188, and 198 etc. Each of these yellow pigments may be used alone, or in a combination of two or more.

Examples of the magenta pigment include C.I. pigment red 1, 3, 5, 8, 9, 16, 17, 19, 22, 38, 57:1, 90, 112, 122, 123, 127, 146, 184, 202, 207, 209, and C.I. pigment violet 1, 3, 5:1, 16, 19, 23, and 38 etc. Each of these magenta pigments may be used alone, or in a combination of two or more.

Of the foregoing chromatic color pigments, cyan pigments are preferable because they have good bronzing-prevention properties. In particular, of the cyan pigments, one or more selected from C.I. pigment blue 15, 15:1, 15:2, 15:3, 15:4, and 16 are preferable for the same reason.

Incidentally, pigments not listed in the color index may also be used, as long as they are insoluble in water.

The water-insoluble vinyl polymer containing a chromatic color pigment is prepared by, for example, the method described in the following procedures (1) to (4).

(1) Mixing process: A colorant, organic solvent, water and neutralizer, which is used when necessary, are mixed using a normal mixing/agitation apparatus such as an anchor blade or turbine blade, and a material mixture is obtained. Here, for sufficient microparticulation, it is desirable that the mixture be kneaded with a kneader. There are two types of kneaders—batch type and continuous type—and an example of the batch type kneader is a double-armed kneader and an example of the continuous type kneader is a self-cleaning kneader. Of these kneaders, the double-armed kneader is preferable in light of mixture type switching and tank cleaning.

(2) Dispersion process: The obtained material mixture is diluted to a desired solid content concentration and dispersion treatment is performed. For dispersion treatment, a ball mill, roll mill, bead mill, high-pressure homogenizer, or high-speed agitation-type dispersion device may be used. Of these devices, the high pressure homogenizer is preferred because there are few inorganic impurities mixed in the homogenizer. Examples of the high pressure homogenizer include those having chambers with flow channels for treatment liquid attached and those having homogeneous valves for adjusting the widths of flow channels for treatment liquids. Examples of the high pressure homogenizer having chambers with flow channels for treatment liquids attached include Microfluidizer (product name, manufactured by Microfluidics), Nanomizer (product name, manufactured by Nanomizer), and Ultimaizer (product name, manufactured by Sugino Machine Limited). Examples of the high pressure homogenizer having homogeneous valves include high pressure homogenizer (product name, manufactured by Rannie), high pressure homogenizer (product name, manufactured by Sanmaru Machinery Co., Ltd.), and high pressure homogenizer (product name, manufactured by Izumi Food Machinery Co., Ltd). During dispersion using a high pressure homogenizer, the pressure is preferably 50 MPa or greater, or more preferably, 80 MPa or greater so that polymer particles having desired particle diameters can be prepared in a short period of time.

(3) Solvent elimination process: By eliminating predetermined amounts of organic solvent and water from the dispersion-treated material mixture, a water-base ink of a desired concentration according to this invention is obtained. This organic solvent elimination process is performed before or after the dispersion process. There is no limitation on the method for eliminating water. For eliminating the organic solvent, vacuum distillation, in particular, thin-film vacuum distillation is preferable. Incidentally, there is no particular limitation on the amount of the organic solvent to be eliminated but, normally, it is preferable that the organic solvent be eliminated entirely.

(4) Coarse particle removal process: After eliminating the solvent, coarse particles may be removed as necessary. For example, by pressure-filtering the resulting ink with a filter or treatment using a centrifugal separator to remove particles having diameter of 2 µm or greater, or preferably, 1 µm or greater, or more preferably, 0.5 µm, so that an ink with high dispersion stability can be obtained.

Incidentally, although the chromatic color pigment is covered with the water-insoluble vinyl polymer, this coating may not be a complete coating and the chromatic color pigment may be partially exposed.

Details of (1) mixing process will be explained below. Preferable examples of the organic solvent used in this mixing process include alcohol type solvent, ketone type solvent, ether type solvent, aromatic hydrocarbon type solvent, aliphatic hydrocarbon type solvent, and halogenated aliphatic hydrocarbon type solvent. A more preferable example is a hydrophilic organic solvent.

Examples of the alcohol type solvent include methanol, ethanol, isopropanol, n-butanol, tertiary butanol, isobutanol, and diacetone alcohol. Examples of the ketone type solvent include acetone, methyl ethyl ketone, diethyl ketone, methyl isobutyl ketone. Examples of the ether type solvent include dibutyl ether, tetrahydrofuran, and dioxane. Examples of the aromatic hydrocarbon type solvent include benzene and toluene. Examples of the aliphatic hydrocarbon type solvent include heptane, hexane, and cyclohexane. Examples of the halogenated aliphatic hydrocarbon type solvent include methylene chloride, 1,1,1-trichloroethane, chloroform, carbon tetrachloride, and 1,2-dichloroethane. Of these, acetone and methyl ethyl ketone are preferable.

An organic solvent and high-boiling-point hydrophilic organic solvent may be used together as necessary. Examples of the high-boiling-point hydrophilic organic solvent include phenoxyethanol, ethylene glycol monomethyl ether, diethylene glycol monomethyl ether, diethylene glycol monoethyl ether, and diethylene glycol diethyl ether.

For a neutralizer, acid or base may be used depending on the type of the salt-forming group. Examples of the acid include inorganic acids such as hydrochloric acid and sulfuric acid, and organic acids such as acetic acid, propionic acid, lactic acid, succinic acid, glycolic acid, gluconic acid, and glyceric acid. Examples of the base include a tertiary amine (such as trimethylamine or triethylamine), ammonia, sodium hydroxide and potassium hydroxide.

There is no particular limitation to the neutralization degree. Normally, it is desirable that the resulting aqueous dispersant is neutral, for example, pH 4.5-10.

The amount of the chromatic color pigment is preferably 100-700 parts by weight, more preferably, 200-600 parts by weight, or more preferably, 300-500 parts by weight per 100 parts by weight of resin solid of the polymer, in light of coloring ability and recovery from clogging.

The amount of the organic solvent is preferably 20 parts by weight or greater, or more preferably, 30 parts by weight or greater, or most preferably, 50 parts by weight or greater per 100 parts by weight of the resin solid of the polymer, in light of blending with the chromatic color pigment. The amount of the organic solvent is preferably 500 parts by weight or less, or more preferably, 300 parts by weight or less, or most preferably, 200 parts by weight or less per 100 parts by weight of the resin solid of the polymer from the viewpoint of obtaining effective shear force when kneading the mixture. In terms of these points, the amount of organic solvent is preferably 20-500 parts by weight, or more preferably 30-300 parts by weight, or most preferably, 50-200 parts by weight per 100 parts by weight of the resin solid of the polymer.

The amount of water is preferably 50-1000 parts by weight, or more preferably, 100-500 parts by weight per 100 parts by weight of the organic solvent, in light of blending with the pigment.

The solid content concentration of the mixture is preferably 50 wt. % or greater, or more preferably, 65 wt. % from the viewpoint of obtaining effective shear force when kneading the mixture. It is also preferable that the solid content concentration is not more than 80 wt. %, or more preferably, not more than 75 wt. % from the viewpoint of avoiding the case where the viscosity of the resulting kneading matter becomes too high to perform homogeneous kneading and preventing the kneading matter from being collapsed and reduced to particles. In light of these points, the solid content concentration of the mixture is preferably 50 wt. % or greater, more preferably 50-80 wt. %, still more preferably 65-80 wt. %, or most preferably, 65-75 wt. %.

Incidentally, the solid content of the mixture refers to the total amount of solid content of the pigment, polymer and neutralizer.

The mean particle diameter of the chromatic color pigment-containing water-insoluble vinyl polymer is preferably 10-500 nm, more preferably, 20-300 nm, or most preferably 50-200 nm in light of the glossiness of printed matter, dispersion stability and preventing nozzle clogging.

There is no particular limitation to the content of the chromatic color pigment as long as a desired print density can be obtained. Normally, the content is 0.1-15 wt. %, more preferably 0.5-10 wt. %, or most preferably 3-8 wt. % from the viewpoint of achieving sufficient ejection stability and print density.

Titanium Dioxide Pigment

For the titanium dioxide pigment in this Embodiment, those titanium dioxide pigments conventionally used for coating materials may be used and there is no particular limitation on the pigment manufacturing method (such as dechlorination, sulfuric acid method). Although the crystal structure may be of either rutile type, anatase type, or brookite type, the rutile type structure is preferable in light of weather resistance and stability. The titanium dioxide pigment may be surface-treated with a metallic compound (such as aluminum, silicon, titanium, or zirconia), a phosphate compound, or organic amines.

The initial particle diameter of the titanium dioxide pigment is preferably 1 μm or less, more preferably 200 nm or less, or most preferably, 100 nm or less in light of the glossiness of printed matter and bronzing-prevention properties.

In this embodiment, "initial particle diameter" refers to the size of a particle composed of a single crystal or gathered crystallites similar to the crystal. The initial particle diameter of the pigment is measured using electronic microscopy. This is a method for measuring the size of a pigment particle using an electron microscope photograph. With this method, a reliable value can be obtained by dispersing the pigment in an organic solvent, fixing it on a support membrane, processing an image of the transmission electron microscope photograph, and measuring the size of the pigment particle. More precisely, the short axis diameters and long axis diameters of the respective initial particle diameters are measured, diameters of circles having the area sizes equivalent to the respective particles are calculated and set as initial particle diameters, 50 or more pigment particles are randomly selected in a given visual field, and a mean value is obtained. Other measuring methods may also be used as long as similar reliability can be obtained but when the numeric values obtained in such methods are different from the numeric values obtained in this electron microscopy, the electron microscopy values are used.

When using the weight of the water-base ink composition as a reference (100 wt. %), the content of the titanium dioxide pigment is preferably, in solid content, 0.01 wt. % or greater, more preferably, 0.1 wt. % or greater, or most preferably 0.1 wt. % or greater, but not more than 5 wt. % in light of the glossiness of printed matter and bronzing-prevention properties. Moreover, when taking into consideration the relationship with the added amount of the chromatic color pigment, the weight ratio between the titanium dioxide pigment and the chromatic color pigment is preferably 1:20-5:1, more preferably 1:8-5:2, or most preferably, 1:2-5:2 in light of the glossiness of the printed matter and bronzing-prevention properties.

Silica Pigment

For a silica pigment used in this Embodiment, those silica pigments conventionally used for coating materials may be used but colloidal silica is preferable in light of the glossiness of printed matter, bronzing-prevention properties and ink storage stability. The colloidal silica is a colloid solution where superfine particles of $SiO_2$, which is a dispersoid, are dispersed in water the dispersion medium—or an organic solvent that can mix well with water. Examples of the colloidal silica include SNOWTEX S colloidal silica, SNOWTEX N colloidal silica, SNOWTEX C colloidal silica, SNOWTEX CM colloidal silica, SNOWTEX XL colloidal silica, SNOWTEX ZL colloidal silica, SNOWTEX UP colloidal silica, SNOWTEX PS-S colloidal silica, SNOWTEX PS-M colloidal silica, SNOWTEX SS colloidal silica, SNOWTEX XS colloidal silica, SNOWTEX 20 colloidal silica, SNOWTEX 30 colloidal silica, SNOWTEX 40 colloidal silica, and SNOWTEX 50 colloidal silica (manufactured by Nissan Chemical Industries).

The pH of most of the above-listed commercially available colloidal silicas are adjusted to be acidic or alkaline. This is because the stable dispersion regions of the colloidal silicas are present on the acidic side or the alkaline side, and accordingly, when adding a commercially available colloidal silica to the water-base ink composition, it is necessary to consider the pH of the stable dispersion region of the colloid and that of the water-base ink composition.

The content of the silica pigment is determined as appropriate depending on its relationships with the added amount of the above-mentioned titanium dioxide pigment and chromatic color pigment, but is preferably, in solid content, 0.01 wt. % or greater, more preferably 0.1 wt. % or greater, or most preferably, 0.1 wt. % or greater but not more than 5 wt. % when using the weight of the water-base ink composition as a reference (100 wt. %).

The initial particle diameter of the silica pigment is preferably 1 μm or less, more preferably, 200 nm or less, or most preferably, 100 nm or less in light of the glossiness of printed matter and bronzing-prevention properties.

In this Embodiment, the weight ratio between the titanium dioxide pigment and the silica pigment is preferably 1:20-20:1, more preferably, 1:15-15:1, or most preferably 1:10-10:1, in light of the glossiness of printed matter and bronzing-prevention properties.

Dispersant

The water-base ink composition according to this Embodiment contains a dispersant for stabilizing the dispersion of a pigment. A dispersant that can be used in the water-base ink composition according to this Embodiment is a copolymer resin having both a hydrophilic portion and a hydrophobic portion in the molecule. Examples of the copolymer resin include: acrylic acid type dispersants such as styrene-acrylic acid copolymer, styrene-acrylic acid-acrylic acid ester copolymer, styrene-methacrylic acid copolymer, and styrene-methacrylic acid-acrylic acid ester copolymer; maleic acid type dispersants such as styrene-maleic acid copolymer, acrylic acid ester-maleic acid copolymer and styrene-acrylic acid ester-maleic acid copolymer; sulfonic acid type dispersants such as acrylic acid ester-styrenesulfonic acid copolymer, styrene-methacrylsulfonic acid copolymer, or acrylic acid ester-allylsulfonic acid copolymer; and salts thereof. A preferable dispersant to be used in the water-base ink composition is a resin dispersant, in particular, a styrene acrylic acid copolymer, and the most preferable dispersant is a copolymer dispersant whose weight-average molecular weight (simply called "molecular weight") is 2000-1000000 and acid value is 100-250.

Commercially available dispersants may be used and examples of the commercially available dispersants include: as an aqueous solution type dispersant, JONCRYL 61 J dispersant (molecular weight: 12000, acid value: 195); and, as an emulsion type dispersant, JONCRYL 450 dispersant (molecular weight 100000-200000, acid value: 100) both manufactured by Johnson Polymer Corporation. A flake type dispersant such as JONCRYL 67 dispersant (molecular weight: 12500, acid value: 213), JONCRYL 678 dispersant (molecular weight: 8500, acid value: 215), JONCRYL 586 dispersant (molecular weight 4600, acid value: 108), JONCRYL 680 dispersant (molecular weight: 4900, acid value 215), JONCRYL 683 dispersant (molecular weight: 8000, acid value: 160), and JONCRYL 690 dispersant (molecular weight: 16500, acid value: 240) may also be used after being alkali-neutralized. Incidentally, a molecular weight refers to a weight-average molecular weight.

Branched Diol

The water-base ink composition according to this Embodiment preferably contains a branched diol, in particular 2-butyl-2-ethyl-1,3-propanediol or 2-methyl-2-propyl-1,3-propanediol. By adding such a specific substance as above to the water-base ink composition containing the chromatic color pigment covered with the foregoing water-insoluble vinyl polymer and the titanium dioxide pigment, excellent coloring ability can be realized on plain papers and excellent glossiness can also be obtained on glossy papers. Also, with the specific alcohol, in addition to the coloring ability and glossiness, reliabilities of the ink such as ejection stability, recovery from clogging, storage stability can also be improved.

Water and Other Components

The water-base ink composition according to this invention contains water as a main solvent. It is desirable to use, as water, pure water or ultra pure water such as ion-exchange water, ultrafiltration water, reverse osmosis water, and distilled water. It is further desirable that the water be sterilized by ultraviolet irradiation or by the addition of hydrogen peroxide, so that the generation of fungus and bacteria is prevented for a long period of time.

A penetration solvent is preferably added to the water-base ink composition according to this invention, in order to improve the wettability for recording media and enhance penetration of the organic pigment. The water-base ink composition preferably contains, as the penetration solvent, a monovalent alcohol, 1,2-alkanediol and/or glycol ether.

Examples of the monovalent alcohol include methanol, ethanol, n-propyl alcohol, isopropyl alcohol, n-butanol, 2-butanol, tert-butanol, iso-butanol, n-pentanol, 2-pentanol, 3-pentanol, 2-methyl-1-butanol, 2-ethyl-1-butanol, 3-methyl-2-butanol, tert-pentyl alcohol, neopentyl alcohol, 2,3-dimethyl-2-butanol, 3,3-dimethyl-2-butanol, 2,4-dimethyl-3-pentanol, 3-ethyl-3-pentanol, 2-methyl-2-pentanol, 4-methyl-2-pentanol, 2,4,4-trimethyl-1-pentanol, 2,2-dimethyl-3-pentanol, 4-methyl-1-pentanol, 3-methyl-2-pentanol, 2-methyl-3-pentanol, 3-methyl-1-pentanol, 2-ethyl-hexanol, 2-methyl-2-hexanol, and 2-methyl-3-hexanol.

Examples of the 1,2-alkanediol include 1,2-octanediol, 1,2-hexanediol, 1,2-pentanediol, and 4-methyl-1,2-pentanediol. Examples of glycol ether include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monobutyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether. One or more of these solvents may be used and its content is preferably 2-15 wt. % in the water-base ink composition from the viewpoint of ensuring appropriate penetration and drying properties.

Another preferable example of the penetration solvent is a surface tension adjuster. Preferable examples of the surface tension adjuster include an acetylene glycol type surfactant and polyether denatured siloxanes. Examples of the acetylene glycol type surfactant include Surfynols 420, 440, 465, 485, 104 and STG (manufactured by Air Products), Olfins PD-001, SPC, E1004 and E1010 (manufactured by Nissin Chemical Industry Co., Ltd.), and Acetylenols E00, E40, E100, and LH (Kawaken Fine Chemicals Col, Ltd.). Examples of the polyether denatured siloxanes include BYK-346, 347, 348 and UV3530 (BYK-Chemie). One or more of these elements can be used in the water-base ink composition so that the surface tension is preferably adjusted to 20-40 mN/m and its content in the water-base ink composition is 0.1-3.0 wt. %.

It is preferable that a wetting agent be added to the water-base ink composition according to this Embodiment in order to keep the water-base ink composition from drying out and for preventing clogging in the inkjet printer head. Examples of the wetting agent include: polyhydric alcohols such as glycerin, 1,2,6-hexanetriol, trimethylolethane, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, and 2-methyl-2,4-pentanediol; saccharides such as glucose, mannose, fructose, ribose, xylose, arabinose, galactose, aldonic acid, glucitol (sorbit), maltose, cellobiose, lactose, sucrose, trehalose, and maltotriose; sugar alcohols; hyaluronic acids; 1,2-dimethylurea; ureas; alkyl alcohols having 1-4 carbons such as ethanol, methanol, butanol, propanol, and iso propanol; 2-pyrolidone; N-methyl-2-pyrolidone; 1,3-dimethyl-2-imidazolidinone; formamide; acetamide; dimethyl sulfoxide; sorbit; sorbitan; acetin; diacetin; triacetin; and sulfolane. One or more of these elements may be used in the water-base ink composition and its content is preferably 10-50 wt. % from the viewpoint of ensuring appropriate properties (such as viscosity), print quality and reliability in the water-base ink composition.

Additives selected from the group consisting of pH adjuster, preservative, antifungal agent, antirust agent, dissolution accelerator, and antioxidant may be added, when desired, to the water-base ink composition according to this Embodiment. For each additive, one or more of kinds may be used together. The additives do not have to be added if it is unnecessary to do so. A person skilled in the art may select and use any of the preferable additives in desired amounts without losing the effect(s) of this invention For a pH adjuster, an alkali metal hydroxide such as lithium hydroxide, potassium hydroxide, or sodium hydroxide, or an amine such as ammonia, triethanolamine, amine, tripropanolamine, diethanolamine or monoethanolamine may be used. From among these, the water-base ink composition may preferably contain at least one pH adjuster selected from the group consisting of alkali metal hydroxide, ammonia, triethanolamine, and tripropanolamine so that it is adjusted to pH 6-10. If the pH is out of this range, it has adverse effects on the materials composing the inkjet printer and degrades recovery from clogging.

Examples of a preservative and antifungal agent include sodium benzoate, sodium pentachlorophenol, 2-pyridinethiol-1-sodium oxide, sodium sorbate, sodium dehydroacetate, and 1,2-diben diso thiazoline-3-on (Proxel CRL, Proxel BDN, Proxel GXL, Proxel XL-2, and Proxel TN (product names, manufactured by AVECIA) but there is no particular limitation on the preservative and antifungal agent.

A dissolution accelerator is an additive for having, when insoluble matters separate out from the water-base ink composition, the insoluble matter dissolve in the water-base ink composition and maintaining the water-base ink composition as a homogeneous solution. Examples of the dissolution accelerator include: pyrolidones such as N-methyl-2-pyrolidone and 2-pyrolidone; ureas such as urea, thiourea, and tetramethylurea; alohanates such as alohanate and methyl alohanate; and biurets such as biuret, dimethylbiuret and tetramethylbiuret, but there is no particular limitation on the dissolution accelerator.

Examples of the antioxidant include but are not limited to L-ascorbic acid and salts thereof.

Recording Method

The recording method according to this Embodiment is a method using the above-mentioned water-base ink composition. Examples of recording methods using water-base ink compositions include inkjet recording methods, recording methods using writing instruments such as pens, and various other printing methods. Accordingly, this water-base ink composition according to this Embodiment may preferably be used for various purposes, for example, writing instruments such as water-base pens, inkjet recording methods, printing, and stamps.

Another mode of the recording method according to this Embodiment provides an inkjet recording method where printing is performed by ejecting and depositing droplets of the water-base ink composition according to this Embodiment on a recording medium. Any method can be used as the inkjet recording method according to this Embodiment as long as it is a method where the water-base ink composition is ejected in the form of droplets from a nozzle and the droplets are deposited on a recording medium. There are various methods known as such methods as above.

One example is an electrostatic attraction method. In this method, printing is performed by applying a strong electric field between a nozzle and an accelerating electrode arranged before the nozzle, continuously jetting an ink in the form of droplets from the nozzle, and providing a print information signal to deflecting electrodes while the ink droplets are flying between the deflecting electrodes. In this method, ink droplets may, as required, also be jetted according to the print information signal without being deflected.

Another method is also available where pressure is applied to an ink liquid using a small pump and a nozzle is mechanically oscillated by a crystal oscillator or the like so that the ink droplets are jetted forcibly. In this method, recording is performed by simultaneously jetting and electric-charging ink droplets and, while the ink droplets are flying between the deflecting electrodes, providing a print information signal to the deflecting electrodes. Still another method using a piezoelectric device is also available. In this method, recording is performed by simultaneously applying pressure to the ink liquid using a piezoelectric device and providing a print information signal to the ink liquid and jetting the ink droplets. Still another method is also available where ink droplets are rapidly volume-expanded by heat energy. In this method, recording is performed by heat-foaming an ink liquid according to a print information signal using a microelectrode and jetting the ink droplets.

There is no particular limitation on the recording medium and various recording media such as plain papers, inkjet papers, plastics, films, and metals may be used.

Recorded Matter

According to this Embodiment, recorded matter recorded by the recording method according to this Embodiment is also provided. This recorded matter is obtained by ejecting droplets of the aforementioned water-base ink composition and depositing them on a recording medium. Because the recorded matter obtained by the recording method according to this Embodiment is recorded using the aforementioned water-base ink composition, it has excellent glossiness and bronzing is prevented. Incidentally, examples of recording media used here include the above-listed recording media.

EXAMPLES

This invention is further explained in detail below, using examples but the scope of this invention is not limited to these examples.

A. Preparation of Water-Insoluble Vinyl Polymer

A reactor was filled with 20 wt. % methyl ethyl ketone, 0.03 wt. % polymerization chain transfer agent (2-mercaptanethanol), and 10% of the total amount of the monomer shown in Table 1, which were mixed. Then, nitrogen gas replacement was performed in the reactor. Meanwhile, a dripping apparatus is filled with the remaining 90% of the above monomer composition. Then, 0.27 wt. % polymerization chain transfer agent (2-mercaptanethanol), 60 wt. % methyl ethyl ketone, and 2,2'-azobis(2,4-dimethyl valeronitrile) were added to the monomer composition in the dripping apparatus and then mixed. After that, nitrogen gas replacement was performed in the dripping apparatus. The temperature of the mixture in the reactor was raised in a nitrogen atmosphere up to 65° C. while agitating the mixture, and the mixture in the dripping apparatus was dripped into the reactor over three hours. After two hours since the dripping at 65° C. was over, a solution where 0.3 wt. % 2,2'-azobis(2,4-dimethyl valeronitrile) was dissolved in 5 wt. % methyl ethyl ketone was added to the resulting mixture. This mixture was then aged for two hours at 65° C. and another two hours at 70° C., and consequently, a polymer solution was obtained.

Some portions of the polymer solution obtained above were vacuum-distilled to eliminate the solvent, dried and isolated, thereby obtaining desired water-insoluble vinyl polymers (water-insoluble polymers 1-3). The monomer composition proportions (wt. %) of the respective water-insoluble vinyl polymers are shown in Table 1.

The weight-average molecular weights of the respective water-insoluble vinyl polymers were determined by gel-permeation chromatography using polystyrene as a reference material and using dimethylformamide containing phosphoric acid having concentration of 60 mmol/L as well as lithium bromide having concentration of 50 mmol/L as a solvent. As a result, the weight-average molecular weights were 70,000 respectively.

TABLE 1

| Relative proportions of monomers in vinyl polymer (weight %) | Water-insoluble vinyl polymer 1 | Water-insoluble vinyl polymer 2 | Water-insoluble vinyl polymer 3 |
|---|---|---|---|
| Methacrylic acid | 20 | 15 | 20 |
| Styrene monomer | 45 | 30 | 40 |
| Benzyl methacrylate | | 20 | |
| Polyethylene glycol monomethacrylate (EO = 15) | 5 | 10 | |
| Polypropylene glycol monomethacrylate (PO = 9) | | 10 | 25 |
| Polyethylene glycol-propylene glycol monomethacrylate (EO = 5, PO = 7) | 10 | | 5 |
| Styrene macromer | 20 | 15 | 10 |

EO: Ethylene oxide
PO: Propylene oxide

B. Preparation of Pigment Dispersed Liquid
Pigment Dispersed Liquid 1

1.5 wt. % water-insoluble vinyl polymer 1 obtained as above was dissolved in 45 wt. % methyl ethyl ketone; a predetermined amount of a neutralizer (aqueous sodium hydroxide at a 20% concentration) was added thereto to neutralize a salt-forming group completely; and then 20 wt. % C.I. pigment blue 15:4 was further added and the mixture was kneaded for two hours using a bead mill. After adding 120 wt. % ultra pure water to the kneaded matter thus obtained and agitating it, methyl ethyl ketone was eliminated under reduced pressure at 60° C., then some water was also eliminated, thereby obtaining a pigment dispersed liquid 1 having a solid content concentration of 20 wt. %.

Pigment Dispersed Liquid 2
Pigment dispersed liquid 2 was obtained the same way using the water-insoluble vinyl polymer 2.

Pigment Dispersed Liquid 3
Pigment dispersed liquid 3 was obtained the same way using the water-insoluble vinyl polymer 3.

Titanium Dioxide Pigment Dispersed Liquid
10 wt. % titanium dioxide pigment (MT-600B manufactured by Tayca Corporation, crystal type: rutile, initial particle diameter: 50 nm), was mixed with 10 wt. % styrene-acrylic resin (Joncryl 61 J manufactured by Johnson polymer, aqueous solution at a 30.5% concentration) as a dispersant, and 70 wt. % ultra pure water, and this mixture was dispersed in a sand mill (manufactured by Yasukawa Seisakusyo) together with glass beads (diameter: 1.7 mm, 1.5 times of the weight of the mixture), for two hours. After dispersion, the glass beads were removed, and finally, a titanium dioxide pigment dispersed liquid having a solid content concentration of 10 wt. % was obtained.

C. Preparation of Water-Base Ink Composition

Examples 1-21 and Comparative Example 1

The respective components are mixed in the proportions shown in Tables 2 and 3 below and agitated for two hours at room temperature, then filtered using Membrane filter (product name, manufactured by Japan Millipore Ltd.) having a pore size of about 8 μm, and finally the water-base ink compositions in examples 1-21 and comparative example 1 were obtained.

Comparative Example 2

C.I. pigment blue 15:4, titanium dioxide pigment (MT-600B manufactured by Tayca Corporation, crystal type: rutile, initial particle diameter: 50 nm), and styrene-acrylic resin (Joncryl 61 J manufactured by Johnson Polymer, 30.5% aqueous solution as a dispersant, were mixed and dispersed in a sand mill (manufactured by Yasukawa Seisakusyo) together with glass beads (diameter: 1.7 mm, 1.5 times of the weight of the mixture), for two hours. After dispersion, the glass beads were removed, the solvent shown in Table 2 and ultra pure water were added to the mixture, and this mixture was agitated for 30 minutes at room temperature and filtered using a membrane filter having a pore size of 8 μm, and finally the water-base ink compositions in comparative example 2 were obtained.

The amounts of components shown in Tables 2 and 3 are expressed in wt. %. "Balance" written in the ultra pure water section means that ultra pure water was added so that the total amount of the ink becomes 100 wt. %. The weight ratios between the titanium dioxide pigments and chromatic color pigments in these water-base ink compositions (expressed as "TiO$_2$/chromatic color pigment" in Tables 2 and 3) were as shown in Tables 2 and 3.

TABLE 2

| Ink structure | Example 1 | Example 2 | Example 3 | Example 4 | Example 5 | Example 6 | Example 7 | Example 8 |
|---|---|---|---|---|---|---|---|---|
| Pigment dispersed liquid 1 | 20 | 20 | | | | | 20 | |
| Pigment dispersed liquid 2 | | | 20 | 20 | | | | 20 |
| Pigment dispersed liquid 3 | | | | | 20 | 20 | | |
| C.I. Pigment Blue 15:4 (solid content) | | | | | | | | |
| Titanium dioxide (solid content) | 2.5 | 1.5 | 2.5 | 1.5 | 2.5 | 1.5 | 2.5 | 2.5 |
| 2-butyl-2-ethyl-propanediol | | | | | | | 2 | 2 |
| 2-methyl-2-propyl-propanediol | | | | | | | | |
| Triethylene glycol monobutyl ether | 2 | 2 | 2 | 2 | 2 | 2 | 2 | |
| 1,2-hexanediol | 2 | 2 | 2 | 2 | 2 | 2 | | 2 |
| 2-butanol | | | | | | | | |
| Glycerin | 10 | 11 | 10 | 11 | 10 | 11 | 10 | 10 |
| Trimethylolpropane | 5 | 5 | 5 | 5 | 5 | 5 | 5 | 5 |
| Triethanolamine | 1 | 1 | 1 | 1 | 1 | 1 | 1 | 1 |
| Olfine E1010 | 1 | 1 | 1 | 1 | 1 | 1 | 1 | 1 |

TABLE 2-continued

| | | | | | | | | |
|---|---|---|---|---|---|---|---|---|
| Surfynol 104 | 0.5 | 0.5 | 0.5 | 0.5 | 0.5 | 0.5 | 0.5 | 0.5 |
| 2-pyrrolidone | 2 | 2 | 2 | 2 | 2 | 2 | 2 | 2 |
| Ultrapure water | Balance | Balance | Balance | Balance | Balance | Balance | Balance | Balance |
| Total | 100 | 100 | 100 | 100 | 100 | 100 | 100 | 100 |
| Weight ratio (TiO$_2$/Chromatic color pigment) | 0.63 | 0.38 | 0.63 | 0.38 | 0.63 | 0.38 | 0.63 | 0.63 |

| Ink structure | | Example 9 | Example 10 | Example 11 | Example 12 | Comparative Example 1 | Comparative Example 2 |
|---|---|---|---|---|---|---|---|
| | Pigment dispersed liquid 1 | | 20 | | | 20 | |
| | Pigment dispersed liquid 2 | | | 20 | | | |
| | Pigment dispersed liquid 3 | 20 | | | 20 | | |
| | C.I. Pigment Blue 15:4 (solid content) | | | | | | 4 |
| | Titanium dioxide (solid content) | 2.5 | 2.5 | 2.5 | 2.5 | | 2.5 |
| | 2-butyl-2-ethyl-propanediol | 2 | | | | | |
| | 2-methyl-2-propyl-propanediol | | 2 | 2 | 2 | | |
| | Triethylene glycol monobutyl ether | | 2 | | | 2 | 2 |
| | 1,2-hexanediol | | | 2 | | 2 | 2 |
| | 2-butanol | 2 | | | 2 | | |
| | Glycerin | 11 | 10 | 10 | 11 | 13 | 10 |
| | Trimethylolpropane | 5 | 5 | 5 | 5 | 5 | 5 |
| | Triethanolamine | 1 | 1 | 1 | 1 | 1 | 1 |
| | Olfine E1010 | 1 | 1 | 1 | 1 | 1 | 1 |
| | Surfynol 104 | 0.5 | 0.5 | 0.5 | 0.5 | 0.5 | 0.5 |
| | 2-pyrrolidone | 2 | 2 | 2 | 2 | 2 | 2 |
| | Ultrapure water | Balance | Balance | Balance | Balance | Balance | Balance |
| | Total | 100 | 100 | 100 | 100 | 100 | 100 |
| | Weight ratio (TiO$_2$/Chromatic color pigment) | 0.63 | 0.63 | 0.63 | 0.63 | — | 0.63 |

Colloidal silica: Snowtex XS (20%, φ4-6 nm) manufactured by Nissan Chemical Industries

TABLE 3

| Ink structure | Example 13 | Example 14 | Example 15 | Example 16 | Example 17 | Example 18 | Example 19 | Example 20 | Example 21 |
|---|---|---|---|---|---|---|---|---|---|
| Pigment dispersed liquid 1 | 20 | | | 20 | | | 20 | | |
| Pigment dispersed liquid 2 | | 20 | | | 20 | | | 20 | |
| Pigment dispersed liquid 3 | | | 20 | | | 20 | | | 20 |
| Titanium dioxide (solid content) | 1.5 | 1.5 | 1.5 | 1.5 | 1.5 | 1.5 | 1.5 | 1.5 | 1.5 |
| Colloidal silica (solid content) | 1.5 | 1.2 | 1.0 | 1.0 | 1.0 | 1.0 | 1.0 | 1.0 | 1.0 |
| 2-butyl-2-ethyl-propanediol | | | | 2 | 2 | 2 | | | |
| 2-methyl-2-propyl-propanediol | | | | | | | 2 | 2 | 2 |
| Triethylene glycol monobutyl ether | 2 | 2 | 2 | 2 | | | 2 | | |
| 1,2-hexanediol | 2 | 2 | 2 | | 2 | | | 2 | |
| 2-butanol | | | | | | 2 | | | 2 |
| Glycerin | 8 | 8 | 9 | 9 | 9 | 10 | 9 | 9 | 10 |
| Trimethylolpropane | 5 | 5 | 5 | 5 | 5 | 5 | 5 | 5 | 5 |
| Triethanolamine | 1 | 1 | 1 | 1 | 1 | 1 | 1 | 1 | 1 |
| Olfine E1010 | 1 | 1 | 1 | 1 | 1 | 1 | 1 | 1 | 1 |
| Surfynol 104 | 0.5 | 0.5 | 0.5 | 0.5 | 0.5 | 0.5 | 0.5 | 0.5 | 0.5 |
| 2-pyrrolidone | 2 | 2 | 2 | 2 | 2 | 2 | 2 | 2 | 2 |
| Ultrapure water | Balance | Balance | Balance | Balance | Balance | Balance | Balance | Balance | Balance |
| Total | 100 | 100 | 100 | 100 | 100 | 100 | 100 | 100 | 100 |
| Weight ratio (TiO$_2$/Chromatic color pigment) | 0.38 | 0.38 | 0.38 | 0.38 | 0.38 | 0.38 | 0.38 | 0.38 | 0.38 |

TABLE 3-continued

| Ink structure | Example 13 | Example 14 | Example 15 | Example 16 | Example 17 | Example 18 | Example 19 | Example 20 | Example 21 |
|---|---|---|---|---|---|---|---|---|---|
| Weight ratio (TiO2 + SiO2/Chromatic color pigment) | 0.75 | 0.68 | 0.63 | 0.63 | 0.63 | 0.63 | 0.63 | 0.63 | 0.63 |

Colloidal silica: Snowtex XS (20%, φ4-6 nm) manufactured by Nissan Chemical Industries D. Evaluation Test (1) Bronzing Evaluation For the water-base ink compositions in examples 1-21 and comparative examples 1 and 2, bronzing evaluation was performed as follows. Using inkjet printers PX-A550 (product name, manufactured by Seiko Epson), patch patterns were printed on photo papers <glossy> (product name, manufactured by Seiko Epson) with a print resolution of 1440×720 dpi and at print duties of 100% and 40%, respectively, and after letting them stand for twenty-four hours at 25° C., color changes that occurred in the reflected light when changing the angles of the printed matter under the light of a fluorescent light (F11 light source) were visually observed and bronzing was evaluated based on the following criteria.

A: In both patches printed at print duties of 100% and 40%, reflected light was white and there was no strangeness.

B: In either the patch printed at a print duty of 100% or the patch printed at a print duty of 40%, reflected light was white and there was no strangeness.

D: In both patches printed at the print duties of 100% and 40%, colors were observed in the reflected light and there was strangeness.

The results were as shown in Tables 4 and 5.

(2) Glossiness Evaluation

The 45-deg specular gloss of the printed matter printed at a print duty of 100% used in the evaluation test (1) was measured using Goniometer (product name, manufactured by Murakami Color Research Laboratory) and glossiness was evaluated based on the following criteria.

AA: 45-deg specular gloss is 35 or greater.
A: 45-deg specular gloss 30 or greater but less than 35.
B: 45-deg specular gloss 25 or greater but less than 30.
C: 45-deg specular gloss less than 25.

The results were as shown in Tables 4 and 5.

(3) Evaluation of Coloring Ability on Plain Paper

The coloring abilities of the water-base ink compositions in examples 1-21 and comparative examples 1 and 2 on plain paper were evaluated as follows. Using the inkjet printers used in evaluation test (1), solid patterns were printed on Xerox-4024 paper with a print resolution of 720×720 dpi and at a print duty of 100%, and after letting them stand for twenty-four hours at 25° C., OD values of the printed matter were measured using Spectrolino (product name, manufactured by Gretag), and evaluated based on the following criteria.

A: OD value 1.2 or greater
B: OD value 1.0-1.2
C: OD value less than 1.0

The results were as shown in Tables 4 and 5.

(4) Evaluation of Ejection Stability

The ejection stabilities of the water-base ink compositions in examples 1-21 and comparative examples 1 and 2 were evaluated as follows. Using the inkjet printer used in the evaluation test (1), each water-base ink composition was loaded in the ink cartridge and, after loading the ink cartridge in the inkjet printer and checking that all the nozzles could perform normal ejection, patch patterns were continuously printed on the photo papers <glossy> under the same conditions as in evaluation 1 at 40° C. For the respective water-base ink compositions, dead dots caused during printing as well as splashes of the water-base ink compositions were observed and their ejection stabilities were evaluated based on the following criteria.

A: No dead dot or splashes of the water-base ink composition even after four hours.

B: After three hours, dead dot(s) or splashes of the water-base ink composition were evident.

C: After two hours, dead dot(s) or splashes of the water-base ink composition were evident.

The results were as shown in Table 4 and 5.

(5) Evaluation of Recovery from Clogging

Clogging recovery properties of the water-base ink composition in examples 1-21 and comparative examples 1 and 2 were evaluated as follows. Using the inkjet printer used in the evaluation test (1), each water-base ink composition was loaded in the ink cartridge, and after loading the ink cartridge in the inkjet printer and checking that all the nozzles could perform normal ejection, the operation of the inkjet printer was stopped, the ink cartridge was removed from the inkjet printer and the ink jet printer was let stand without a cap on its printer head for one week at 40° C. After that, the ink cartridge was loaded in the inkjet printer again and the number of times cleaning was required until the water-base ink composition was ejected from all the nozzles was counted and recovery from clogging was evaluated based on the following criteria.

A: All nozzles recovered after two or less cleanings.
B: All nozzles recovered after three to five cleanings.
C: All nozzles still not recovered even after six cleanings.

The results were as shown in Table 4 and 5.

(6) Evaluation of Storage Stability

Storage abilities of the water-base ink compositions in examples 1-21 and comparative examples 1 and 2 were evaluated as follows. 50 g of each water-base ink composition was put in an aluminum package and let stand for two weeks at 60° C. After that, whether there was foreign matter (floating matter or sediment) was visually observed. For those inks where there was no foreign matter found, changes in their properties (such as viscosity, surface tension, pH, particle diameter) were checked and their storage abilities were evaluated based on the following criteria.

A: No foreign matter generated and no change in properties.
B: No foreign matter generated but properties changed slightly.
C: Foreign matter generated or properties changed dramatically.

The results were as shown in Tables 4 and 5.

TABLE 4

| Evaluation Item | Example 1 | Example 2 | Example 3 | Example 4 | Example 5 | Example 6 | Example 7 | Example 8 |
|---|---|---|---|---|---|---|---|---|
| Bronzing (Evaluation test 1) | A | B | A | B | A | B | A | A |
| Glossiness (Evaluation test 2) | A | A | A | A | A | A | AA | AA |
| Plain paper coloring ability (Evaluation test 3) | A | A | A | A | A | A | A | A |
| Ejection stability (Evaluation test 4) | A | A | A | A | A | A | A | A |
| Clogging recoverability (Evaluation test 5) | A | A | A | A | A | A | A | A |
| Storage stability (Evaluation test 6) | A | A | A | A | A | A | A | A |

| Evaluation Item | Example 9 | Example 10 | Example 11 | Example 12 | Comparative Example 1 | Comparative Example 2 |
|---|---|---|---|---|---|---|
| Bronzing (Evaluation test 1) | A | A | A | A | C | A |
| Glossiness (Evaluation test 2) | AA | AA | AA | AA | A | B |
| Plain paper coloring ability (Evaluation test 3) | A | A | A | A | A | C |
| Ejection stability (Evaluation test 4) | A | A | A | A | A | A |
| Clogging recoverability (Evaluation test 5) | A | A | A | A | A | A |
| Storage stability (Evaluation test 6) | A | A | A | A | A | A |

TABLE 5

| Evaluation Item | Example 13 | Example 14 | Example 15 | Example 16 | Example 17 | Example 18 | Example 19 | Example 20 | Example 21 |
|---|---|---|---|---|---|---|---|---|---|
| Bronzing (Evaluation test 1) | A | A | A | A | A | A | A | A | A |
| Glossiness (Evaluation test 2) | A | A | A | AA | AA | AA | AA | AA | AA |
| Plain paper coloring ability (Evaluation test 3) | A | A | A | A | A | A | A | A | A |
| Ejection stability (Evaluation test 4) | A | A | A | A | A | A | A | A | A |
| Clogging recoverability (Evaluation test 5) | A | A | A | A | A | A | A | A | A |
| Storage stability (Evaluation test 6) | A | A | A | A | A | A | A | A | A |

As explained above, with the ink composition, recording method using this ink composition, and recorded matter printed by this recording method according to this invention, excellent coloring ability can be obtained and bronzing can be prevented without degrading the glossiness of printed matter.

What is claimed is:

1. A water-base ink composition comprising the following components: a chromatic color pigment covered with a water-insoluble vinyl polymer; a titanium dioxide pigment; a silica pigment; a branched diol and water; wherein the chromatic color pigment is a cyan pigment selected from the group consisting of C.I. pigment blue 15, 15:1, 15:2, 15:3, 15:4 and 16; wherein the water-insoluble vinyl polymer is obtained by copolymerizing: (1) a macromer; (2) a polyoxyalkylene group-containing monomer; (3) a salt-forming group-containing monomer and (4) a monomer that can be copolymerized with the macromer, polyoxyalkylene group-containing monomer, and salt-forming group-containing monomer respectively; wherein the branched diol is selected from the group consisting of 2-methyl-2-propyl-1,3-propanediol and 2-butyl-2-ethyl-1,3-propanediol; and wherein the weight ratio between a total of the titanium dioxide pigment and silica pigment, and the chromatic color pigment is 1:20 to 5:1.

2. The water-base ink composition according to claim 1, wherein the weight ratio between a total of the titanium dioxide pigment and silica pigment, and the chromatic color pigment is 1:20 to 5:1.

3. The water-base ink composition according to claim 1, wherein a solid content of the titanium dioxide in the water-base ink is compositions is 0.1 wt. % or greater but not more than 5 wt. %, and wherein the branched diol is present in an amount effective to improve glossiness of print formed with the water-base ink composition on glossy paper.

4. The water-base ink composition according to claim 1, wherein the copolymerizable monomer is one or more selected from the group consisting of a long-chain alkyl group-containing monomer, aromatic ring-containing monomer, and macromer.

5. The water-base ink composition according to claim 1, wherein the macromer is a styrene type macromer having a polymerizing functional group on one of its ends.

6. The water-base ink composition according to claim 4, wherein the long-chain alkyl group-containing monomer is expressed by the following formula (I):

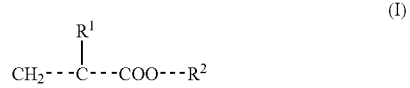

(I)

wherein $R^1$ is a hydrogen atom or alkyl group and $R^2$ is a monovalent hydrocarbon having 16-30 carbons that may have a hetero atom.

7. The water-base ink composition according to claim 1, wherein the initial particle diameter of the titanium dioxide pigment is not more than 1 μm.

8. The water-base ink composition according to claim 1, wherein the silica pigment is a colloidal silica.

9. The water-base ink composition according to claim 1, further containing a penetration solvent and/or a wetting agent.

10. The water-base ink composition according to claim 9, wherein the penetration solvent is a penetrating organic solvent selected from the group consisting of monovalent alcohols, glycol ethers, and 1,2-alkanediols.

11. An inkjet recording method for performing printing comprising ejecting a droplet of the water-base ink composition of claim 1 and depositing it on a recording medium.

12. A recorded matter recorded by the inkjet recording method according to claim 11.

* * * * *